March 17, 1936.     W. MARSHALL     2,034,109
SPRING SEAT
Filed July 3, 1933

INVENTOR
William Marshall.
BY
Dike, Calver & Gray
ATTORNEYS.

Patented Mar. 17, 1936

2,034,109

UNITED STATES PATENT OFFICE 2,034,109

SPRING SEAT

William Marshall, Detroit, Mich., assignor to Briggs Manufacturing Company, Detroit, Mich., a corporation of Michigan Application July 3, 1933, Serial No. 678,776

2 Claims. (Cl. 155—179)

This invention relates to spring or cushion seats or back rests, particularly, although not exclusively, adapted for automobiles, an object of the invention being to provide a spring seat structure, as well as a back rest, constructed in an improved manner whereby the use of conventional coiled springs is eliminated, while at the same time a spring or cushion seat is provided which will secure the maximum comfort to the occupant of the vehicle.

A further object of the invention is to provide an improved spring or cushion seat as well as a back rest, which will be simplified in construction, relatively economical to manufacture, durable in use, and relatively light in weight as compared with conventional automobile seat units, whereby a substantial reduction in weight may be obtained, substantial economies effected, and maximum riding qualities maintained.

Another object of the invention is to provide means to facilitate and simplify the interconnection of the units of the spring structure.

Other objects of this invention will appear in the following description and appended claims, reference being had to the accompanying drawing forming a part of this specification wherein like reference characters designate corresponding parts in the several views.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
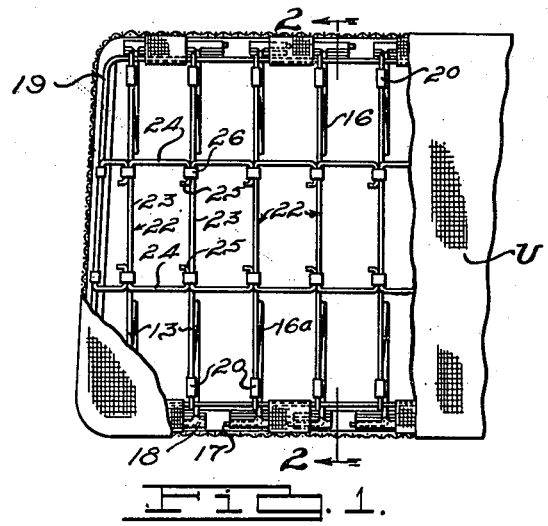
Fig. 1 is a plan view, partly broken away, showing one form of spring structure made in accordance with the invention.
Figure 2:
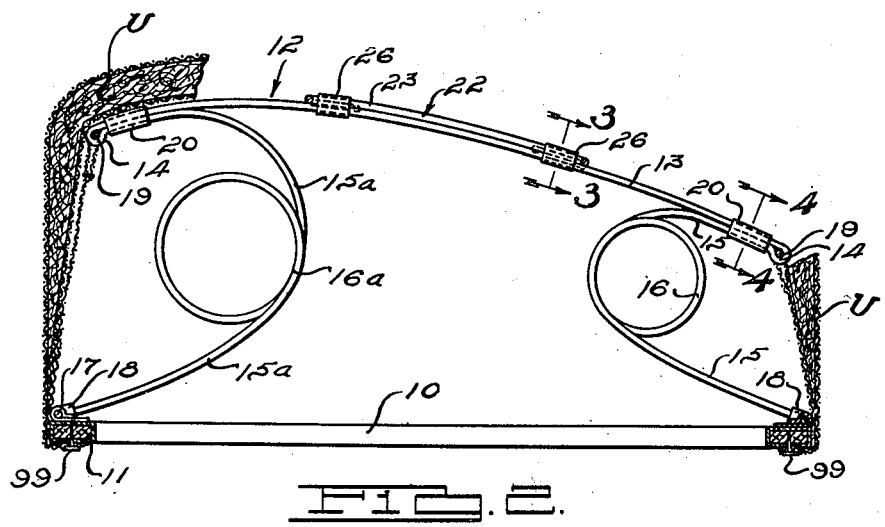
Fig. 2 is a transverse vertical section, partly in elevation, taken substantially along the line 2—2 of Fig. 1.
Figure 3:
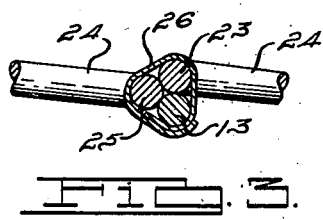
Fig. 3 is an enlarged detail view taken substantially along the line 3—3 of Fig. 2.
Figure 4:
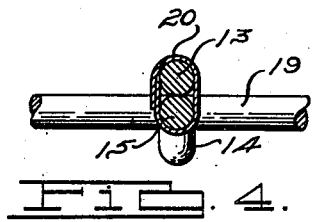
Fig. 4 is an enlarged detail view taken substantially along the line 4—4 of Fig. 2.

Referring now particularly to Figs. 1 to 4 inclusive, there is shown one form of the invention adapted to be applied in connection with seats, although the structure therein shown is equally capable of use as a seat back. 10 represents a substantially rectangular channel frame or base having wood inserts 11 providing tacking strips. The spring structure comprises a series or plurality of transversely extending wire formed spring members or units, each shown as a whole at 12. Each spring member comprises an upper course 13 which, as shown, may be slightly bowed or curved outwardly. The members 12 are each formed from a single piece of wire which is bent back at opposite ends of the course 13 to provide loops 14. The wire is then curved inwardly to form at one end a bow 15 having a coil 16 and at its opposite end a larger bow 15a having a larger diameter coil 16a, these bowed members providing the leg sections for the spring member or unit. The free ends 17 of the leg sections 15, 15a may be bent at an angle laterally and held to the top of the base or frame member 10 in any suitable manner, as by means of metal clamps 18 which are spot welded or riveted to the base. The loops 14 at each side receive and support a border wire 19. This wire is clamped in the loops as by means of metal bands 20 which hold the adjacent ends of the course and the bows 15 together. Referring to Fig. 1, it will be seen that a plurality of these wire formed spring members extend transversely of the spring structure and are located in predetermined positions throughout substantially the length of the seat or back. It will be seen also that the upper courses 13 of the units extend substantially the full width of the seat or back.

In practice it has been found desirable to secure the courses 13 together and at the same time to reinforce the spring members or units 12. According to the present form of the invention, I employ wire-formed members 22, each of which is preferably formed from a single piece of wire bent into substantially rectangular form and having a main body portion 23, end portions 24 and legs 25. The body portion 23 and the legs 25 extend in substantially parallel planes, which are also parallel to the upper courses 13, whereas the end portions 24 extend at right angles to the courses and are of a length substantially equal to the distance between a pair of said courses. Thus the members 22 have spaced portions which cooperate with the spaced upper courses 13 and can be secured to the courses by a flat band or wire 26 (see Fig. 3). This construction permits the portions 23 and 25 of adjacent members 22 to be connected to each course 13 in an easy and secure manner. The members 22 thus provide reinforcing connections for the spring units 12 and additionally serve to maintain the upper courses 13 of these units in predetermined spaced relation.

After the spring units 12 are assembled with the base 10, the spring structure is covered with padded upholstery U, the fabric of which is attached to the frame by tacks 99 which engage the tacking strips 11.

From the foregoing it will be seen that in the embodiment herein shown by way of example a seat or back structure is formed by means of parallel wire formed spring members each providing an upper course terminating at at least one end in an inwardly extending bowed leg section, and that the arrangement and construction is preferably such that the spring structure is unbalanced so that opposite sides will have unequal resiliency.

It will also be noted that one edge in the case of a back rest and the forward edge in the case of a seat proper, is more yieldable under pressure than the opposite edge, that the courses are unsupported intermediate the leg sections, and that the resistance of the spring members to pressure progressively and uniformly increases from the center toward each longitudinal edge but at a disproportionately greater rate toward one edge than toward the opposite edge.

I claim:

1. A spring seat comprising a series of transversely extending spring members each formed from a single piece of wire having an upper course extending substantially the width of the seat, said wire being bent back upon itself to provide loops at opposite ends of the course and curved to provide bow-like supporting leg sections for the seat, coils formed in said bows, a border wire extending through said loops, and a plurality of substantially oblong wire-formed members arranged edge to edge and extending longitudinally of the spring seat for interconnecting and reinforcing said spring members and for maintaining them in predetermined spaced relation.

2. A spring seat comprising a series of transversely extending spring members each formed from a single piece of wire having an upper course extending substantially the width of the seat, the wire of each course being bent at opposite ends of the course to provide spring coils forming inwardly bowed leg sections, the upper portions of said sections extending parallel to said upper course and secured thereto, and a border wire secured to the corresponding ends of the courses.

WILLIAM MARSHALL.